United States Patent [19]

Ash

[11] Patent Number: 5,401,794
[45] Date of Patent: Mar. 28, 1995

[54] STABILIZED POLYKETONE POLYMER COMPOSITIONS

[75] Inventor: Carlton E. Ash, Sugar Land, Tex.

[73] Assignee: Shell Oil Company, Houston, Tex.

[21] Appl. No.: 253,656

[22] Filed: Jun. 3, 1994

[51] Int. Cl.6 .............................................. C08K 5/01
[52] U.S. Cl. .................................... 524/485; 524/486
[58] Field of Search ................ 523/125, 136; 524/486, 524/485

[56] References Cited

U.S. PATENT DOCUMENTS

| | | | |
|---|---|---|---|
| 2,495,286 | 1/1950 | Brubaker . | |
| 2,599,501 | 6/1952 | Upson | 525/340 |
| 2,986,545 | 5/1961 | Fitzpatrick et al. | 524/485 |
| 3,671,488 | 6/1972 | Stuetz | 524/485 |
| 3,694,412 | 9/1972 | Nozaki et al. | 528/492 |
| 3,753,952 | 8/1973 | Guillet | 523/125 |
| 3,933,772 | 1/1976 | Takahashi et al. | 524/485 |
| 3,935,141 | 1/1976 | Potts et al. | 524/485 |
| 3,985,938 | 10/1976 | Takahashi et al. | 524/485 |
| 4,016,135 | 4/1977 | Takahashi et al. | 524/485 |
| 4,104,244 | 8/1978 | Chuchin et al. | 524/485 |
| 4,192,942 | 3/1980 | Mainord | 528/392 |
| 4,360,606 | 11/1982 | Tobias et al. | 523/125 |
| 4,458,047 | 7/1984 | Vanderwerff | 524/485 |
| 4,798,884 | 1/1989 | Brons et al. | 528/392 |
| 4,857,570 | 8/1989 | Smutry | 524/112 |
| 4,900,766 | 2/1990 | Kubo et al. | 523/136 |

FOREIGN PATENT DOCUMENTS

| | | |
|---|---|---|
| 56-008863 | 2/1981 | Japan . |
| 56-116729 | 9/1981 | Japan . |
| 57-009398 | 2/1982 | Japan . |
| 60-094494 | 5/1985 | Japan . |

*Primary Examiner*—Veronica P. Hoke

[57] ABSTRACT

It is herein disclosed a process for stabilizing freshly prepared polyketone polymer comprising contacting the polymer with a sufficient quantity of a stabilizing agent such as a polyaromatic or hydroaromatic compound. The inventive process results in stabilized polyketone polymers having and exhibiting improved thermal oxidative stability properties. It is also disclosed a stabilized polymer composition comprising a major amount of a polyketone polymer and a minor amount of a polyaromatic or hydroaromatic compound.

10 Claims, No Drawings

STABILIZED POLYKETONE POLYMER COMPOSITIONS

FIELD OF THE INVENTION

This invention generally relates to polyketone polymers. More particularly, this invention relates to stabilized polyketone polymers, and to a novel process for producing such stabilized polymers.

BACKGROUND OF THE INVENTION

Polymers of carbon monoxide and olefins generally referred to as polyketones are well known in the art. Of particular interest among polyketone polymers, is the class of linear alternating polymers of carbon monoxide and at least one ethylenically unsaturated hydrocarbon. This class of polymers is disclosed in numerous U.S. patents assigned to Shell Oil Company, exemplified by U.S. Pat. No. 4,880,865 which is herein incorporated by reference.

Although the properties of polyketone polymers are suitable for many applications, linear alternating polymers of carbon monoxide and at least one ethylenically unsaturated hydrocarbon do exhibit a deterioration of physical properties upon thermal oxidative degradation. This degradation is due to a chemical attack of atmospheric oxygen on the polymer chains and is characteristic of most, if not all organic polymers. Oxidation is typically autocatalytic and occurs as a function of heat and oxygen, hence the term thermal oxidative degradation. It is desirable to inhibit the deterioration of polymer properties by stabilizing the polymer toward the adverse effects of heat and oxygen. There are a large number of thermal oxidative stabilizers which are employed commercially to stabilize thermoplastic polymers against such degradation. However, many of the thermal stabilizers which are known to be effective with polyolefins, polyamides, polyacetals, polyacrylates, etc. are only marginally or not at all effective when employed with polyketone polymers. It would therefore be of advantage to provide polyketone polymers which demonstrate improved heat stability to extend their use in higher temperature applications.

SUMMARY OF THE INVENTION

It is a general object of this invention to provide a stabilized polyketone polymer.

It is a further object of this invention to produce an oxidatively stable polyketone polymer.

It is also an object of this invention to provide a process for producing an oxidatively stabilized polyketone polymer.

Accordingly, it is now provided a method for producing an oxidatively stabilized polyketone polymer, comprising contacting polyketone polymer with at least one member of a family of ring assembled organic hydrocarbons, herein after sometimes referred to as polyaromatic or hydroaromatic compounds or as stabilizing agent.

It is also provided an oxidatively stabilized blend comprising a major amount of polyketone polymer and a minor amount of at least one polyaromatic or hydroaromatic compound.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), a polyaromatic or hydroaromatic compound and other common polymer additives. For instance, fillers, extenders, lubricants, pigments, plasticizers, and other polymeric materials can be added to the polyketone compositions being stabilized to improve or otherwise alter the properties of the compositions. In general, the practice of this invention involves suitably contacting sufficient quantities of the useful material to form a stabilized polyketone polymer composition.

The polyaromatic compounds (stabilizing agent(s)) of the present invention yield polyketone polymers with improved heat stability when the additive is adequately dispersed in the polymer matrix. Dispersion of the stabilizing agent(s) in the polymer can be accomplished by a variety of methods known to those skilled in the art.

Thermal oxidative degradation of organic polymers relates to the deterioration of polymer properties due to the chemical reaction(s) between the polymer and atmospheric oxygen. While oxidation processes are complicated and mechanistic pathways of oxidation between different polymers may vary, oxidation is generally promoted by heat, often initiated by trace impurities such as metal ions or organic prodegradants, and characterized overall as autocatalytic in which carbon radicals and peroxyl radicals constitute key intermediates in the catalytic cycles. Consumption of oxygen by the polymer propagates the catalytic cycle and generates oxygenated species which either comprise part of the polymer or are evolved as gaseous products. These oxygenated species may further be prodegradative to the polymer. For example, hydroperoxides are not inherently stable and are capable of decomposing into new radicals, either thermally or catalyzed by trace impurities, which can then initiate additional oxidative cycles.

For polyketones it is believed that the thermal oxidative process involves the formation of oxygenates which under aging conditions cleave polymer chains and result in a reduction of molecular weight and a loss of polymer entanglement. Ultimately this results in a deterioration of polymer mechanical properties such as reduced impact strength, loss of elongation at break, and embrittlement. It would therefore be advantageous to stabilize the polyketone polymers towards these property losses either by reducing the overall rate of oxidation or reducing the rate of polymer chain scission. While not wishing to be held to any mechanism, it is believed that the inventive stabilizers effectively scavenge carbon radicals responsible for propagating the oxidation cycle.

Inventive stabilizers can be used in combination with other polymer additives, especially stabilizing additives, e.g. processing/melt stabilizers, photostabilizers, or other thermal oxidative stabilizers, especially hindered phenolic antioxidants.

The polymer of the invention, the inventive stabilizing agents, conventional additives typically useful in the formulation of the inventive composition, and a process for producing the stabilized polyketone polymer of the invention are discussed in more details in various sections of this specification.

The polyketone polymers which are employed as the major component of the oxidatively stabilized polymer composition of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

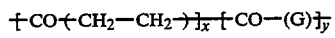

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(CH$_2$—CH$_2$)— units and the —CO—(G)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,834,144 which is herein incorporated by reference.

Polyaromatics useful in the practice of this invention can be represented by the illustrative formula:

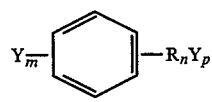

R = aromatic and/or nonaromatic carbon ring assembly(ies) containing 1-20 rings with at least 3 carbon atoms per ring; the rings may be bonded to each other in such a way that no carbon atoms are in common between rings and/or carbon atoms are shared between rings. R may be identically or nonidentically repeated around the benzene ring shown, where n=1-6, and may be bonded to the benzene ring with the sharing and/or nonsharing of carbon atoms.

Y=hydrogen and/or alkyl substituents containing 1-6 carbon atoms, m=0-5 and p=2 or greater.

Polyaromatic compounds include polyphenyls which are ring assemblies with two or more benzene rings linked together with single attachment points, and polynuclear aromatics which are carbon ring systems containing at least one benzene ring attached to two or more fused carbon rings. Hydroaromatic compounds are those which are based structurally on polyaromatics, yet possess reduced unsaturation (aromaticity) through the incorporation of hydrogen atoms while still maintaining at least one benzene ring in the compounds. Additional information on these polyaromatic and hydroaromatic compounds can be found in Kirk-Othmer Encyclopedia of Chemical Technology (3rd Ed., Vol. 12) page 898 et seq.

Most preferred stabilizing additives are those which possess a balance between low volatility, low toxicity, and adequate stabilizing effectiveness.

Examples of the polyaromatic or hydroaromatic compounds useful in the practice of this invention are shown below:

EXAMPLES

Naphthalene

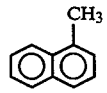

Methylnaphthalene

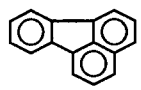

Fluoranthene

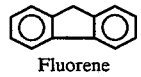

Fluorene

Pyrene

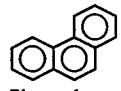

Phenanthrene

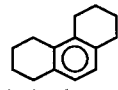

Octahydrophenanthrene

Tetralin

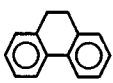
9,10-dihydrophenanthrene

Anthracene

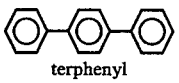
terphenyl

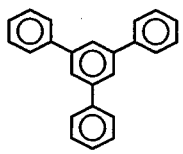
1,3,5-triphenylbenzene

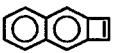
cyclobuta[b]naphthalene

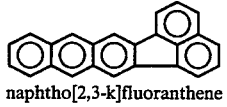
naphtho[2,3-k]fluoranthene

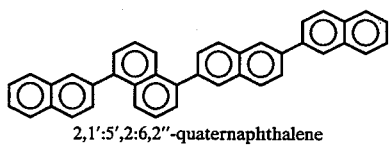
2,1':5',2:6,2''-quaternaphthalene

Broadly speaking, the process of the invention involves dispersing a sufficient amount of the stabilizing agent into polyketone polymer to improve the thermal oxidative stability of the polymer. In general, the stabilizers of this invention are employed in an amount within the range of from 0.01 to about 10 percent based on the weight of the polyketone polymer, preferably in the range of from 0.1 to 1.0 percent based on the weight of polyketone polymer. The stabilizer may be incorporated into the polyketone polymer at any stage of its processing, preferably prior to being subjected to elevated temperature, or at such times as desired to improve thermal oxidative stability. The method of incorporating the stabilizer is not considered to be critical so long as the method results in a substantially uniform blend of the composition components.

The method of contacting the polymer with the stabilizing agent is not limiting and can include any method typically utilized by those skilled in the art such as melt extrusion, solvent deposition, and masterbatch letdowns.

After preparation, the now stabilized polyketone polymers show improved retention of desired mechanical properties, such as resistance to embrittlement when tested under conditions of elevated temperature and air exposure. The test as disclosed in U.S. Pat. No. 4,994,511 subjects polymer samples to aerobic oven aging at various temperatures and monitors the time until brittle failure (cracking) occurs when sharply bent at an angle of 180°. It has also been observed that model compounds (low molecular weight polyketones) exhibit similar stabilization when analyzed after aging in an oxygen environment in the presence of the inventive additives.

As will be seen from the examples and data table disclosed herein, freshly prepared polyketone polymers comprising the inventive stabilizing agent and prepared according to the methods of this invention have and exhibit improved stability, particularly improved thermal oxidative stability.

The following examples and tables further illustrate the various aspects of the invention.

Example 1

A linear, alternating terpolymer of carbon monoxide, ethylene, and propylene with a melting point of 220° C. and limiting viscosity number, LVN, of 1.87 dl/g when measured in m-cresol at 60° C. was used in this example. The polymer was substantially free of any polymer additives and was considered to be unstabilized. An oven aging test was used to distinguish the performance of polymer additives in this polyketone polymer. In this test, polymer sheets of 20 mil thickness were prepared by compression molding at 230° C. Test specimens were then cut into 1 cm wide strips and placed into a forced air circulating oven at 125° C. Periodically, the strips were withdrawn from the oven and, when cool, bent to a 180-degree angle. When the samples became sufficiently brittle to crack or break under this test procedure, it was considered to be a failure and the time to embrittlement was recorded.

The polyketone polymer powder was combined under a nitrogen atmosphere with additives identified in Table 1.

TABLE 1

| Oven aging of polyketone polymer at 125° C. | |
|---|---|
| Polymer Composition[a] | Oven Life, days |
| Control (no additives) | 15 |
| + AO[b] | 26 |
| + AO + 0.25% Fluoranthene | 33 |
| + AO + 0.25% Pyrene | 33 |
| + AO + 0.25% Phenanthrene | 34 |
| + AO + 0.25% 9,10-dihydrophenanthrene | 35 |

[a]Weight percentage.
[b]AO = 0.5% Irganox 245 [triethyleneglycol bis[3-(3'-tert-butyl-4'-hydroxy-5'-methylphenyl)propionate].

The blends were then homogenized for at least 12 hours by off-center tumbling. Melt compounding was carried out using a 15 mm Baker Perkins twin screw extruder with a nitrogen blanket over the feed port. The extruder was operated with a polymer melt temperature of about 250° C. After compounding, the samples were submitted to compression molding and tested in the manner previously described. The results shown in Table 1 show that while hindered phenolic antioxidants such as Irganox 245 are beneficial in improving oven life over the control, all four polyaromatic additives employed resulted in additional protection to the polymer.

Example 2

To determine the stabilizing ability of phenanthrene on low molecular weight polyketone model compounds, 0.25 g of 3,6,9-undecanetrione were placed in 30 ml, stainless steel closed vessels and exposed to 1.10 bar of pure oxygen. One vessel contained only triketone, while other vessels contained triketone with additive amounts of Irganox 1076 and/or phenanthrene. The vessels were then heated for 240 hrs at 100° C. and then cooled. At 23° C., the pressures were monitored using a transducer to observe the amount of pressure drop from the original 1.10 bar $O_2$. Any pressure drop was associated with oxidation, and those samples showing the greatest percentage of pressure drop gave the greatest level of oxidation products. To estimate the level of oxidation products, triketone samples were dissolved in dueutrated methylene chloride ($CD_2Cl_2$) and analyzed by $H^1$ and $C^{13}$ NMR using a Bruker AMX 400 spectrometer.

TABLE 2

Oxidation of 3,6,9-undecanetrione in oxygen at 100° C.

| Additive[a] | $O_2$ press. drop, %[b] | Oxidation Products, mole %[c] |
|---|---|---|
| None | 46% | 29% |
| 0.9% Irganox 1076[d] | 45% | 15% |
| 0.5% Phenanthrene | 31% | X |
| 0.25% Phenanthrene + 0.45% Irganox 1076 | 4% | 0.7% |

[a]Weight percentage.
[b]Percent pressure drop based on initial pressure of 1.10 bar.
[c]Mole % estimated based on initial moles triketone.
[d]Irganox 1076 [octadecyl 3,5-bis(1,1-dimethylethyl)-4-hydroxybenzene-propanoate].
X Not measured but reasonably expected to be a number less than 15 but greater than 0.7.

Table 2 shows that phenanthrene used alone was observed to be a stabilizing additive, but the combination of the hindered phenolic antioxidant, Irganox 1076, with phenanthrene was synergistic in protecting the triketone model compound from oxidation—only 0.7 mole % of oxidation products were observed.

While this invention has been described in detail for the purpose of illustration, it is not to be construed as limited thereby but is intended to cover all changes and modifications within the spirit and scope thereof.

What is claimed is:

1. A stabilized polymer blend comprising a major amount of a linear alternating polymer of carbon monoxide and at least one ethylenically unsaturated hydrocarbon and in an amount sufficient to inhibit the polymer's thermal oxidative degradation a stabilizing agent selected from the group consisting of polyaromatic, polynuclear aromatic, and hydroaromatic compounds of the formula

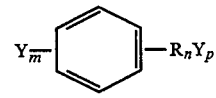

wherein R is an aromatic and/or nonaromatic carbon ring assembly containing 1-20 rings with at least 3 carbon atoms per ring; the rings may be bonded to each other in such a way that no carbon atoms are in common between rings and/or carbon atoms are shared between rings, R may be identically or nonidentically repeated around the benzene ring shown, n is 1-6, and may be bonded to the benzene ring with the sharing and or nonsharing of carbon atoms, Y is hydrogen and/or alkyl substituents containing 1-6 carbon atoms, m is 0-5, and p is 2 or greater.

2. A blend as in claim 1 wherein said stabilizing agent is phenanthrene.

3. A blend as in claim 1 wherein said stabilizing agent is 9,10-dihydrophenanthrene.

4. A blend as in claim 1 wherein said stabilizing agent is fluoroanthene.

5. A blend as in claim 1 wherein said stabilizing agent is pyrene.

6. A blend as in claim 1 wherein said stabilizing agent is selected from the group consisting of naphthalene, methylnaphthalene, fluorene, octahydrophenanthrene, tetralin, anthracene, terphenyl, 1,3,5-triphenylbenzene, cyclobutanaphthalene, naphthofluoranthene, and 2,1′:5′, 2:6, 2″-quaternaphthalene.

7. A blend as in claim 1 wherein said stabilizing agent is present in an amount within the range of from about 0.1 to 10 weight percent.

8. A blend as in claim 6 wherein said stabilizing agent is present in an amount of from about 0.1 to 1.0 weight percent.

9. A process for producing the blend of claim 1 comprising admixing said polymer with a sufficient amount of said stabilizing agent.

10. A shaped article of manufacture produced with the blend of claim 1.

* * * * *